_United States Patent_ [19]

Baker

[11] Patent Number: 4,458,486
[45] Date of Patent: Jul. 10, 1984

[54] WOBBLE-TORQUE HYDRAULIC TRANSMISSION

[76] Inventor: Charles H. Baker, 5607 Velma Ave., Parma, Ohio 44129

[21] Appl. No.: 294,078

[22] Filed: Aug. 19, 1981

[51] Int. Cl.³ ............................................. F16D 31/02
[52] U.S. Cl. ....................................... 60/437; 60/490; 60/494
[58] Field of Search ................. 60/460, 466, 490, 494, 60/435, 437

[56] References Cited

U.S. PATENT DOCUMENTS

| | | | |
|---|---|---|---|
| 1,111,994 | 9/1914 | Ciarlo | 60/437 |
| 3,054,263 | 9/1962 | Budzich et al. | 60/490 X |
| 4,223,532 | 9/1980 | Shiber | 60/435 X |

FOREIGN PATENT DOCUMENTS 1425805  2/1969  Fed. Rep. of Germany ........ 60/490

Primary Examiner—Edward K. Look
Attorney, Agent, or Firm—Edwin E. Greigg

[57] ABSTRACT

This invention is directed to a wobble-torque hydraulic transmission device which has variable forward and reverse speeds and is also provided with a straight-through drive feature. The device is provided with a coaster brake feature that prevents the device from running away when going downhill. Also, the device is provided with a brake assembly that prevents rotation of the piston-pump means during forward and reverse operation but permits rotation for straight-through drive.

7 Claims, 14 Drawing Figures

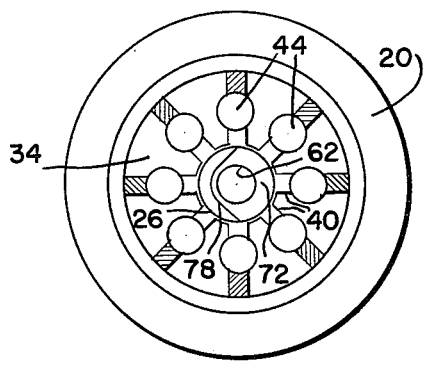
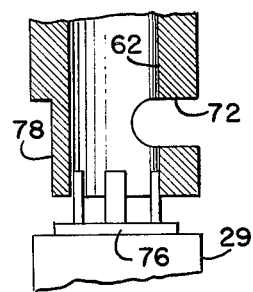
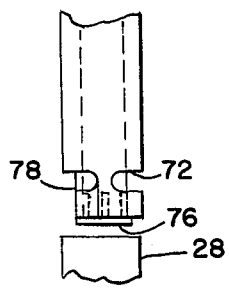
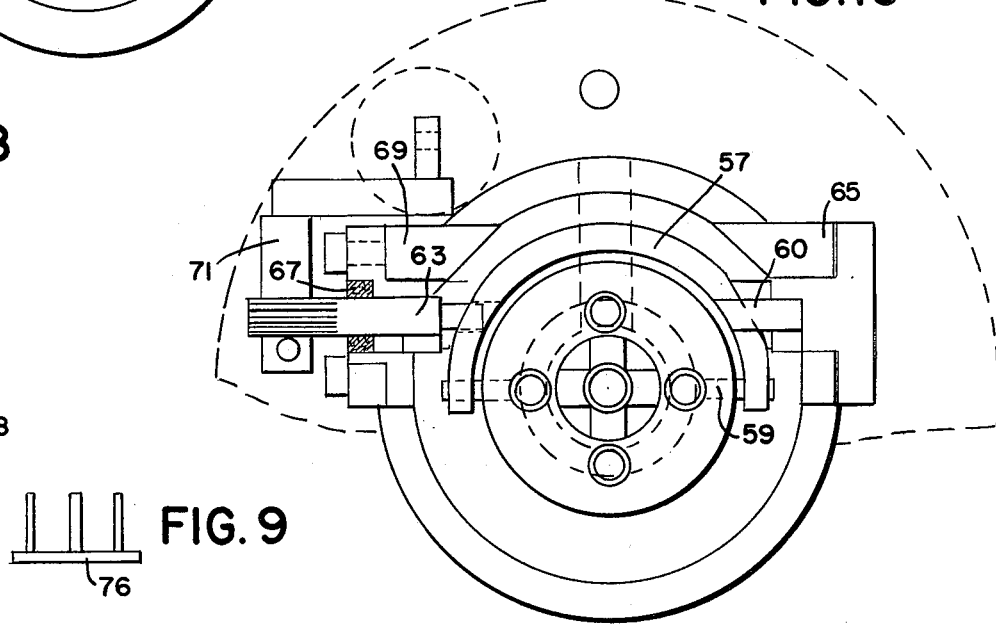
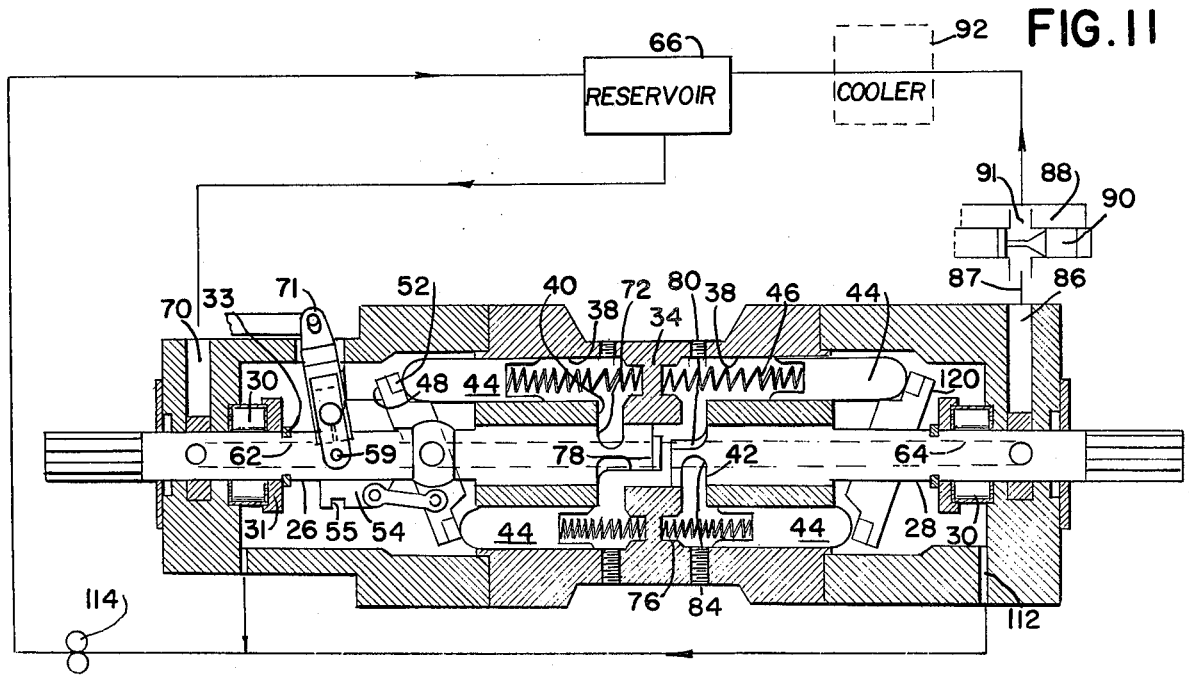

WOBBLE-TORQUE HYDRAULIC TRANSMISSION

BACKGROUND OF THE INVENTION

This invention relates to hydraulic transmissions for providing a varying ratio between a power source and a power consuming device and more particularly to a wobble-torque hydraulic transmission including a forward and a reverse variable speed range.

Hydraulic transmissions are well known for use in providing the driving force driving automobiles, trucks and other types of moving devices. Some such transmissions have automatic shifting mechanisms for different speed ranges and some are variable between zero and maximum speed range. These transmissions are known to use variable pistons for pumping fluid that produces the moving power for the moving device. Such devices use wobble-plates or cams for actuation of the pistons for varying the forward speed; however, the prior art transmissions are not known to use a wobble-plate for varying the reverse speed.

OBJECT AND SUMMARY OF THE INVENTION

This invention makes use of wobble-plate driven pistons for variable forward speed and for variable reverse speed. The transmission makes use of a partially hollow input drive shaft which transmits the motive power and the hydraulic fluid from a source to the forward and reverse pistons, and a partially hollow output drive shaft which directs the fluid back to the fluid source. The input drive shaft is provided with a valve on its inner end which permits fluid to flow directly to the output section so that it will not run away when the output shaft is driven faster than the input shaft. The transmission is provided with a brake for braking the transmission.

Another object is to provide a coasting brake feature in a hydraulic transmission.

Still another object is to provide a transmission in which the drive shaft and driven shaft are used for fluid flow to and from the operative pistons.

The invention will be better understood, and further objects and advantages thereof will become more apparent from the ensuing detailed description of a preferred embodiment taken in conjunction with the drawing.

BRIEF DESCRIPTION OF THE DRAWINGS

FIG. 6 is a view taken along line 6-6 of FIG. 1 which illustrates the arrangement of the cylinders;

FIG. 7 is a partial cross-sectional view of the end of the drive shaft and the valve therein in open position;

FIG. 8 is a partial view of the drive shaft end illustrating the end valve in the closed position;

FIG. 9 is a side view of the end valve for the end of the drive shaft;

FIG. 10 is a cross-sectional view more clearly illustrating the wobble-plate control;

FIG. 11 illustrates a wobble-torque transmission lacking a reverse and straight-through drive feature;

DETAILED DESCRIPTION

Figure 1:
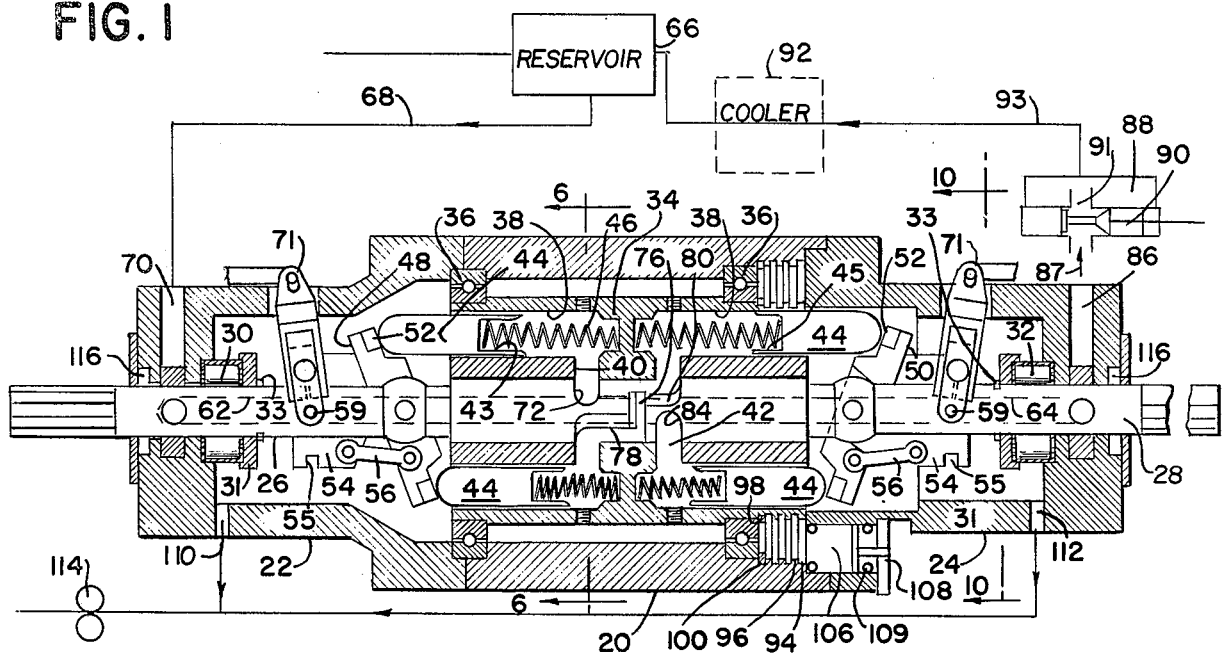
FIG. 1 is a partial cross-sectional view along the axis illustrating the relative parts.
Figure 2:
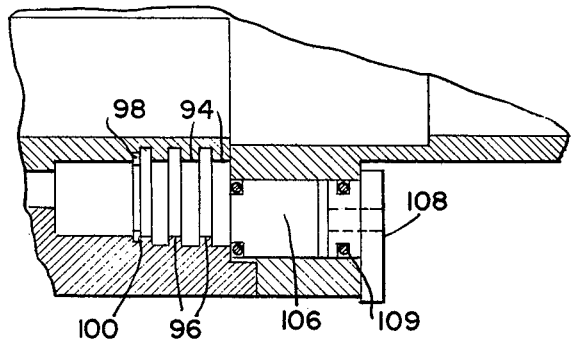
FIG. 2 is a partial view of the brake mechanism illustrating the relationship of the brake disc and their relationship to the housing and cylinder blocks, also illustrating one of the pistons for operating the brake disc.
Figure 3:
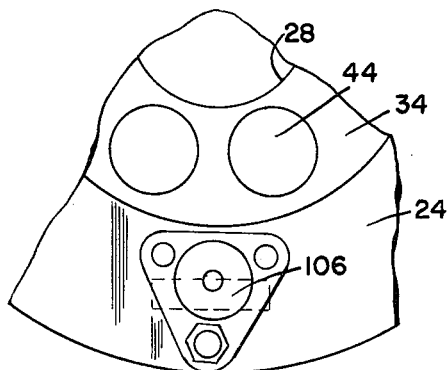
FIG. 3 is a partial end view illustrating the brake piston end-cap and fluid inlet and outlet to the brake piston.
Figure 4:
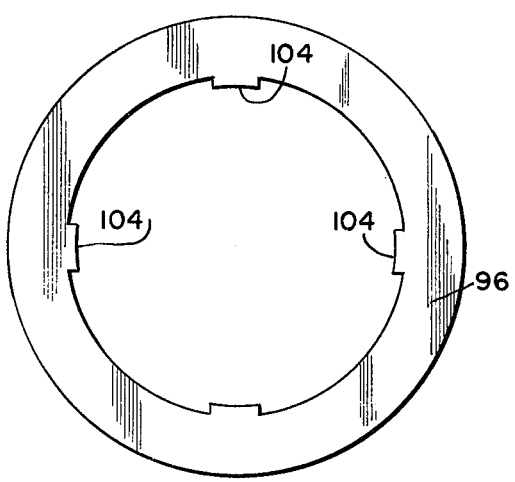
FIG. 4 illustrates the inner brake disc that is secured to the rotatable cylinder.
Figure 5:
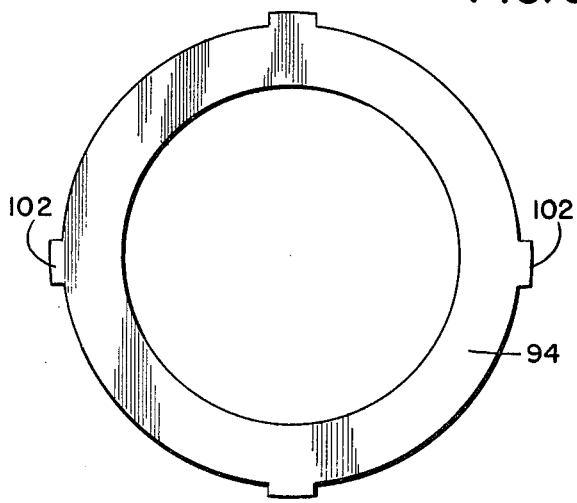
FIG. 5 illustrates the outer brake disc that is secured to the housing and held stationary by the housing.

The wobble-torque hydraulic transmission of this invention includes a central housing section 20 with end caps 22 and 24. An input drive shaft 26 and an axially aligned output driven shaft 28 are journaled in bearings 30 and 32 in the end caps 22, 24, respectively. The bearings are held in place on the shaft between a backing plate 31 held in place by a snap ring 33 which snaps in a groove in the shaft and the end cap that forces the bearing against the backing plate. The adjacent ends of drive shaft 26 and driven shaft 28 are supported by bearing surfaces on the axis of a cylinder block 34 which is journaled in bearings 36 coaxial with the drive and driven shafts and rotatable with respect to the drive and driven shafts. The bearings 36 are held in place between the end caps and the central section of the housing.

The cylinder block contains bores 38 parallel with the axis with the bores open on one end and closed on the other and annular ports 40, 42 perpendicular with the axis near the closed ends. The bores form cylinders which receive pistons 44 in their open ends which are shown rotated 90° to show their slotted ends 45. The pistons are spring-biased by springs 46 toward a forward cylindrical drive wobble-plate 48 and a cylindrical reverse drive wobble-plate 50. Each of the pistons are semi-spherical on their ends and trace a short radial path on the front bearing surfaces 52 of their respective wobble-plate. Each of the wobble-plates are coaxially aligned with the shaft and pivotably secured to their respective shaft for angular adjustment relative to the shaft and rotation therewith. The forward and reverse drive wobble-plates are adjusted with respect to the drive shaft and the pistons 44 by use of a slidable collar 54 coaxial with the drive shaft which rotates with the shaft and slides along the drive shaft. The collar is connected to the wobble-plate by a connecting link 56. The connecting link moves parallel with the drive shaft in order to move the wobble plate and bearing surface 52 of the wobble-plate on an angle relative to the shaft. The collar 54 is provided with an annular slot 55 and adjusted axially by use of non-rotatable yoke 57 shown in FIG. 10. The yoke 57 is semi-circular in form, fits over the collar and is provided on its ends with fixed inwardly extending pins 59 that extend into the slot 55 in the collar 54. The yoke is secured in place and pivotable about a pin 60 fixed to one side thereof and a rotatable shaft 63 which extends through one side of the housing and functions to pivot the yoke for control of the wobble-plates. As shaft 63 is rotated, pins 59 move the collar 54 and subsequently the wobble-plate. The pin 60 is rotatable in a blind boss 65 that forms a bearing for the pin 60. The shaft 63 is rotatable in a bearing 67 secured in the boss 69. The outer end of the shaft 63 is serrated and a control lever 71 is secured therto for rotation of the shaft 63. The lever 71 is powered by a hydraulic piston mounted on the side of the end caps 22 and 24. The hydraulic piston is controlled by any well known hydraulic control system 73 with a suitable fluid supply. The forward and reverse drive wobble-plates are provided with the same type of control attachment and adjusting means for controlling the angle of the wobble-plate relative to the pistons.

The drive and driven shafts are hollow or provided with an axial passage 62, 64, respectively. Fluid is admitted to the forward drive pistons from a reservoir 66, through a feed line 68 and a port 70 to the passage 62 in the drive shaft. The fluid is admitted to the forward drive pistons through a port 72 near the inner end of the drive shaft into an annular port 40 in the cylinder block. The end of the drive shaft is provided with a pressure operated valve 76 which is forced against the inner end of the driven shaft when the pressure in the drive shaft passage is greater than the pressure on the face of the valve 76. A portion of the outer surface of the inner end of the drive shaft toward the valve 76 is cut away to form a passage 78 through which fluid flows from the forward drive pistons in the cylinder block to the reverse drive pistons in the cylinder block. The fluid flows along the face of valve 76 along a cut-away portion 80 of the driven shaft into the annular port 42 in the reverse drive cylinder block. The driven shaft is provided with a port 84 through which fluid flows to the passage 64 in the driven shaft. The fluid flows from the passage in the driven shaft through a port 86 in the end cap through a line 87, to a brake control valve 88. The brake control valve is provided with a piston 90 that closes off the passage 91 from the port 86 to a line 93 that conducts the fluid back to the reservoir. A cooler 92 may be used for cooling the fluid if desired.

The transmission is provided with a piston operated brake that controls rotation of the cylinder block relative to the housing. (See FIGS. 2–5). The brake is formed by alternating stationary and rotatable thin plates or discs 94 and 96 adjacent one of the bearings for the cylinder block. The bearing is held in place by inner and outer snap rings 98 and 100. The inner snap rings fits into a groove in the cylinder block and the outer snap ring fits into a groove in the housing. The stationary brake plates 94 are provided with equally spaced tabs 102 that fit into axially aligned grooves in the inner surface of the housing that prevent rotation of the plates. The rotatable brake plates 96 are provided with equally spaced tabs 104 on their inner surface which fit into axially parallel grooves in the outer surface of the cylinder block. Thus the rotatable brake plates rotate with the cylinder block. Three or more brake control pistons 106 are assembled in the end cap and enclosed by a plate 108 in order to apply pressure on the face of the outermost stationary brake plate which then applies pressure on the faces of the rotatable plates in order to prevent the cylinder block from rotating. O-ring 109 prevents fluid from leaking from the piston cylinder. The brake is used to hold the cylinder block stationary within the housing during forward and reverse power transmission. The fluid to the brake piston is supplied under pressure to the brake piston from a brake cylinder for actuation of the brake.

Each of the end caps 22 and 24 are provided with drain ports 110 and 112 through which any fluid that leaks into the end cap areas may be pumped back to the supply tank by a pump 114. The apertures in the end cap through which the shafts extend are provided with suitable packing 116 to prevent leakage. Any other seals and gaskets may be used at any place within the housing where fluid leakage may be a problem.

Obviously there are applications where a reverse function and a straight-through drive are not desired; therefore, the above described structure can be modified as shown in FIG. 11. In the modification shown by FIG. 10, the arrangement of parts is somewhat the same as shown in FIG. 1. The wobble-plate 120 is fixed to the driven shaft and is not adjustable. The cylinder block is fixed between the end plates therefore the cylinder block does not rotate. Also, since the cylinder block does not rotate there is no need to use a brake to prevent the cylinder block from rotating. As shown, the wobble-plate 120 is fixed to the shaft and not adjustable relative to the shaft. Since the wobble-plate is not adjustable, there is no need for the slot in the end cap through which the shift lever was inserted. In this modification only the input drive wobble-plate is adjustable. The variable forward drive functions as in the device of FIG. 1.

The transmission herein described may be operated for variable forward drive, variable reverse drive, and straight-through power transmission with no friction from the pistons or fluid losses.

For forward drive, brake piston 106 is activated to apply a brake force onto brake disc 94 and 96 which prevent the cylinder block 34 from rotating. The wobble-plate 50 is shifted to the position shown in FIG. 1 and the wobble-plate 48 is shifted at an angle with respect to the shaft as shown in FIG. 1 to obtain a variable forward speed. Fluid from the supply tank 66 is admitted to the hollow shaft 26 through line 68 and port 70. The fluid passes through passage 62 in the shaft 26 out through port 72 and port 40. The fluid enters the piston chambers 38 and as the wobble-plate rotates the pistons are forced into the cylinder forcing the fluid out of the cylinders under pressure. The fluid under pressure is forced between the cut-out 78 along the end of the shaft 26 between the valve 76 and the end of the driven shaft 28 into the piston cylinders on the driven shaft. The pressure of the fluid on the pistons 44 reacting against the wobble-plate 50 forces the wobble-plate and shaft 28 to rotate. The fluid pumped by the pistons 44 on the driven shaft passes through ports 42 and 84 into the passage 64 of shaft 28. The fluid flows through port 86, line 87 through passage 91 in brakevalve 88 and into the supply via the cooler if one is provided. As the fluid is pumped out by the pistons, new fluid is admitted through passage 62 in shaft 26. Forward speed is changed by changing the angle of the wobble-plate 48 relative to the drive shaft and consequently the pistons. The greater the angle away from vertical, the greater the speed. With the wobble-plate in a vertical position or perpendicular to the drive shaft there will be no fluid pumped and consequently no forward motion.

In order to reverse the direction of movement, the wobble-plate 50 is shifted such that the angle is reversed. The upper side as shown in FIG. 1 is moved over beyond center toward the cylinder block and the bottom as shown in FIG. 1 will be away from the cylinder block. In a reverse position from that shown in FIG. 1, the reverse speed is then variable by adjusting the angle of wobble-plate 48 on the driven shaft 26. Since the pressure of the fluid forced from the drive pistons is greater than the fluid pressure in passage 62, the valve 76 will remain closed during all power driving. In the event that the driven pistons pump fluid from their cylinders such as when going downhill, the valve 76 will automatically open due to lack of pressure on its face and additional fluid will be admitted directly to the driven pistons. This operation prevents the output shaft from running away.

The transmission can be used for braking by closing the brake valve 88; that is, by forcing the piston 90 over to close off fluid flow from the transmission. When fluid is prevented from flowing from the output pistons, the pistons are restrained against movement due to the backing up of fluid and the wobble-plates will not move easily. The output shaft therefore applies a braking effort to slow the vehicle down. Because braking may be required at a slow or fast speed, the brake valve 88 is of a balanced variable area configuration. The brake valve functions as a coaster brake.

The transmission may be used for a direct drive by closing the brake valve 88 to block the passage of fluid and by releasing the brake pistons 106. Releasing the brake pistons 106 permits the whole cylinder block to rotate simultaneously with the drive shaft. While the whole cylinder block rotates with the drive shaft 26, the pistons will not be pushed in and no fluid will flow. Since the pistons are not pushed in, the driven shaft will be rotated directly by the driven pistons. Thus, the transmission will operate as if there was a direct drive with the driving motive force.

In the modification shown by FIG. 11, the driven wobble-plate and the cylinder block are fixed. Therefore there is no need for the piston operated brake to hold the cylinder block in place. This transmission device will operate with only a variable forward speed.

Figure 12:
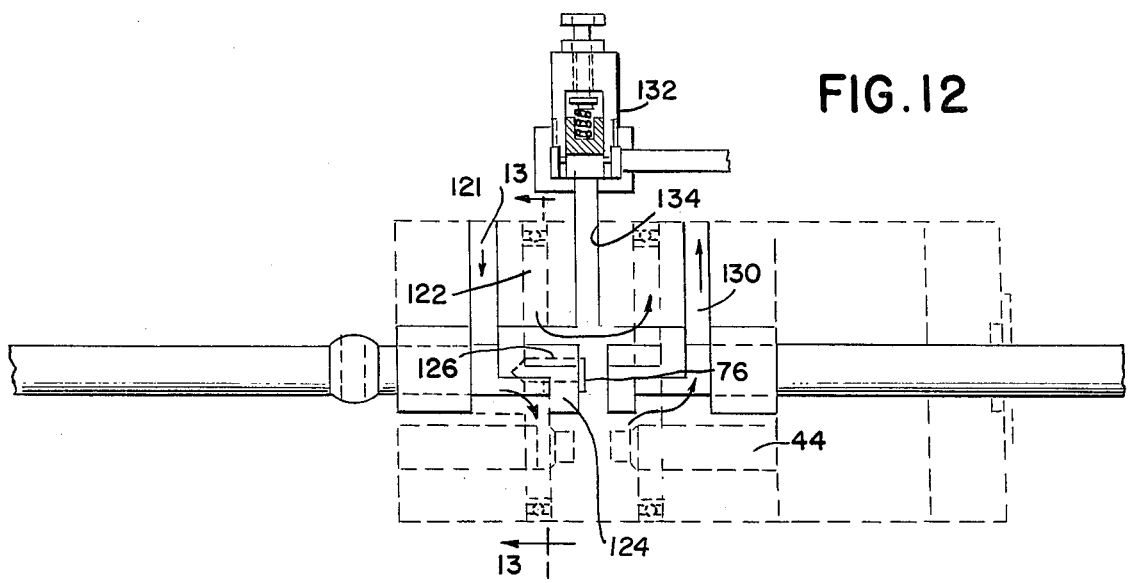
FIG. 12 is a modification of the device shown in FIG. 11.

Wobble-torque drives may be used for machine tools such as lathe spindles, drives for milling machine tables, as well as for other devices. In machine tools, it is well known that the machine may stop rotating due to too great a cut, broken tools or any other obstructions that may impede normal operation. In the event the driven or output shaft stops, pressure will build up between the driving or input shaft and the driven or output shaft. In order to prevent damage to the transmission due to excessive pressure, a modification that includes an adjustable over-running relief valve is provided as shown in FIG. 12.

In this modification, the piston cylinder blocks for the input and output shafts are fixed; therefore, there is no need for the brake as set forth above for the device of FIG. 1. The fluid is admitted through the housing along inlet 121 which is near the ends of pistons 44 and which pass through the cylinder block. The fluid flows around the input shaft to port 122 or port 40 (FIG. 11) in the housing along the ends of the pistons. A passage 134 extends to an axial passage 126 along the inner end of the input shaft. The axial passage 126 is provided with an end valve 76 such as shown in FIG. 8. The fluid from the output pistons 44 is directed through output passage 130 to the output line as shown in FIG. 1.

In this modification, the device is provided with an adjustable over-running relief valve 132 connected to a passage 134 that extends from the high pressure area near the end of the input shaft to the outside of the housing to which the relief valve is secured. In operation, the fluid flow is as shown by the arrows.

Figure 13:
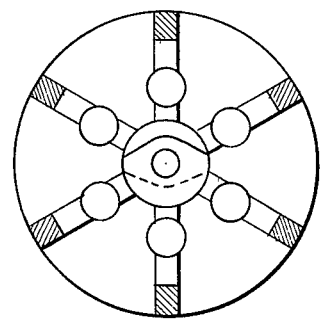
FIG. 13 illustrates the construction of the housing in the pressure area looking along lines 13-13 of FIG. 12.
Figure 14:
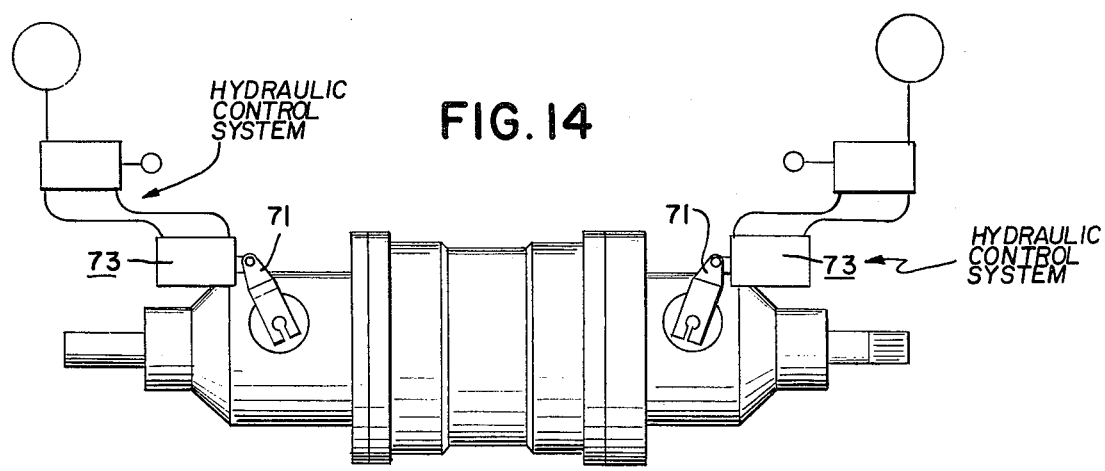
FIG. 14 is a side view of a completely assembled transmission.

FIG. 13 illustrates the arrangement of the pistons and the configuration of the housing in the vicinity of the end of the input shaft. The housing is so constructed that the incoming fluid will be pumped under pressure by the pistons to the pressure input of the pistons for the output shaft. In the event of stoppage of the output shaft, pressure built up will open the pressure relief valve 132 and the fluid will be pumped to the output line 93 as shown in FIG. 1. In this modification the wobble-torque device operates without a straight through drive or reverse.

The foregoing relates to a preferred exemplary embodiment of the invention, it being understood that other embodiments and variants thereof are possible within the spirit and scope of the invention, the latter being defined by the appended claims.

What is claimed and desired to be secured by letters patent of the United States is:

1. A fluid drive transmission comprising:
   a cylinder block;
   said cylinder block including first and second plurality of equally spaced axially parallel bores closed on one end and open on the opposite end;
   an annular port extending into said first and second plurality of bores near their closed end perpendicular to the axis of said cylinder block;
   a piston in each of said bores of said first and second plurality of equally spaced parallel bores;
   spring means in each of said bores biasing said piston away from said closed ends;
   a drive shaft supported in a bearing at one end with the opposite end journaled in said cylinder block;
   a driven shaft supported in a bearing at one end with the opposite end journaled in said cylinder block in axial spaced relationship with said drive shaft;
   said drive shaft and said driven shaft including a passage along the axis thereof over a portion of their length;
   a port in said drive shaft for admitting fluid from said passage in said drive shaft to said pistons in said first plurality of bores in said cylinder block;
   a port in said driven shaft for admitting fluid in said pistons in said second plurality of bores in said cylinder block to said passage in said driven shaft to an outlet associated with said passage in said driven shaft;
   a first wobble-plate secured to said drive shaft relative to said pistons in said first plurality of equally spaced bores for engagement therewith;
   means for adjusting said first wobble-plate axially relative to said pistons in said first spaced bores; and
   a second wobble-plate secured to said driven shaft relative to said pistons in said second plurality of equally spaced bores for engagement therewith.

2. A fluid drive transmission as claimed in claim 1, which includes:
   a brake valve associated with said outlet associated with said passage in said driven shaft for braking said transmission.

3. A fluid drive transmission as claimed in claim 2, which includes:
   a pressure valve;
   said pressure valve operative in the end of said drive shaft journaled in said cylinder block to control flow of fluid directly through said drive shaft.

4. A fluid drive transmission as claimed in claim 1, which includes:
   a central housing surrounding said cylinder block;

bearings within said central housing for rotatably supporting said cylinder block for rotation relative to said central housing;

brake means for securing said cylinder block against rotation within said central housing;

said second wobble-plate is pivotably secured to said driven shaft; and means for adjusting said second wobble-plate relative to said pistons in said second plurality of equally spaced bores in said cylinder block.

5. A fluid drive transmission as claimed in claim 2, which includes:

a central housing surrounding said cylinder block;

bearings within said central housing for rotatably supporting said cylinder block for rotation relative to said central housing;

brake means for securing said cylinder block against rotation within said central housing;

said second wobble-plate is pivotably secured to said driven shaft; and means for adjusting said second wobble-plate relative to said pistons in said second plurality of equally spaced bores in said cylinder block.

6. A fluid drive transmission as claimed in claim 3, which includes:

a central housing surrounding said cylinder block;

bearings within said central housing for rotatably supporting said cylinder block for rotation relative to said central housing, brake means for securing said cylinder block against rotation within said central housing;

said second wobble-plate is pivotably secured to said driven shaft; and means for adjusting said second wobble-plate relative to said pistons in said second plurality of equally spaced bores in said cylinder block.

7. A fluid drive transmission as claimed in claim 6, in which:

said brake means includes a plurality of first and second brake plates;

said first brake plates having tabs thereon which secure said plates to said central housing against rotation; and said second brake plates including tabs thereon which secure said second brake plates to said cylinder block.

* * * * *